Oct. 22, 1963
R. R. YOUNG ETAL
3,107,795
APPARATUS FOR LOADING BULK MATERIAL
Filed Dec. 16, 1959
4 Sheets-Sheet 1
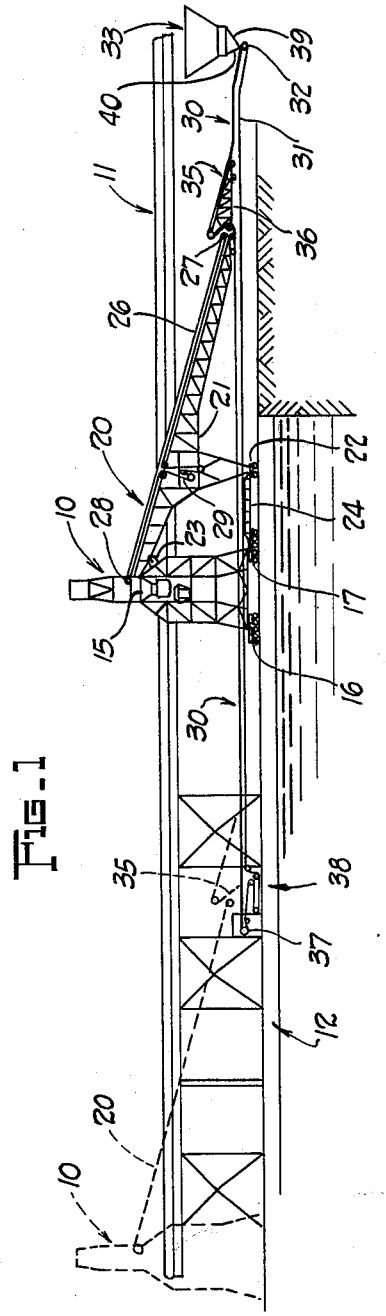
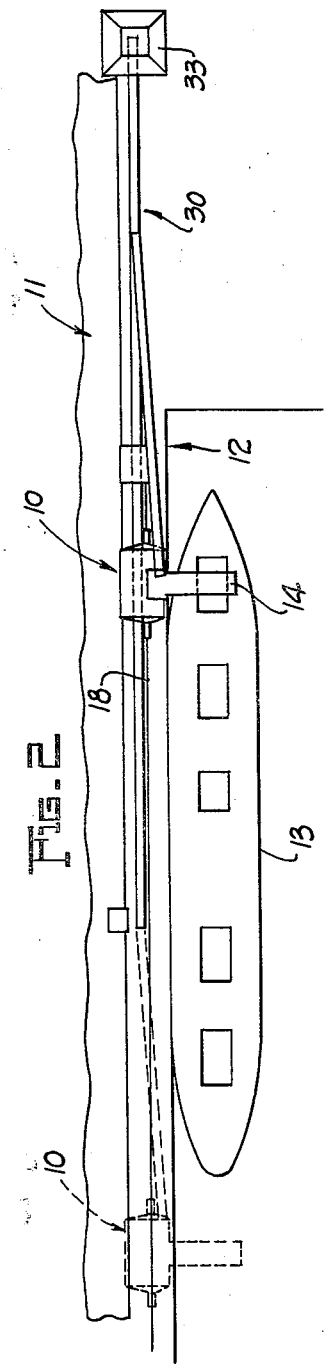
INVENTOR.
ROBERT R. YOUNG
CARL LUDWIG
BY FLORENCIO SANTIAGO
ATTORNEY.

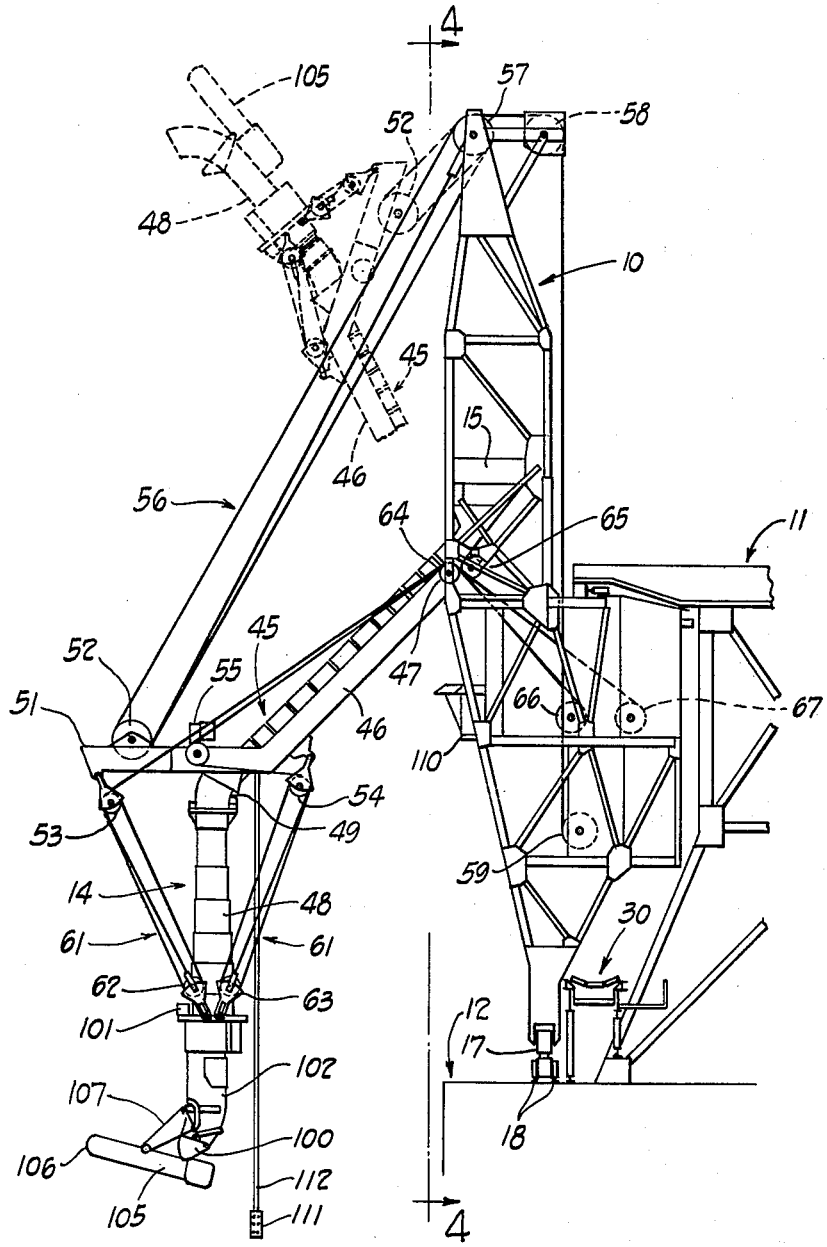

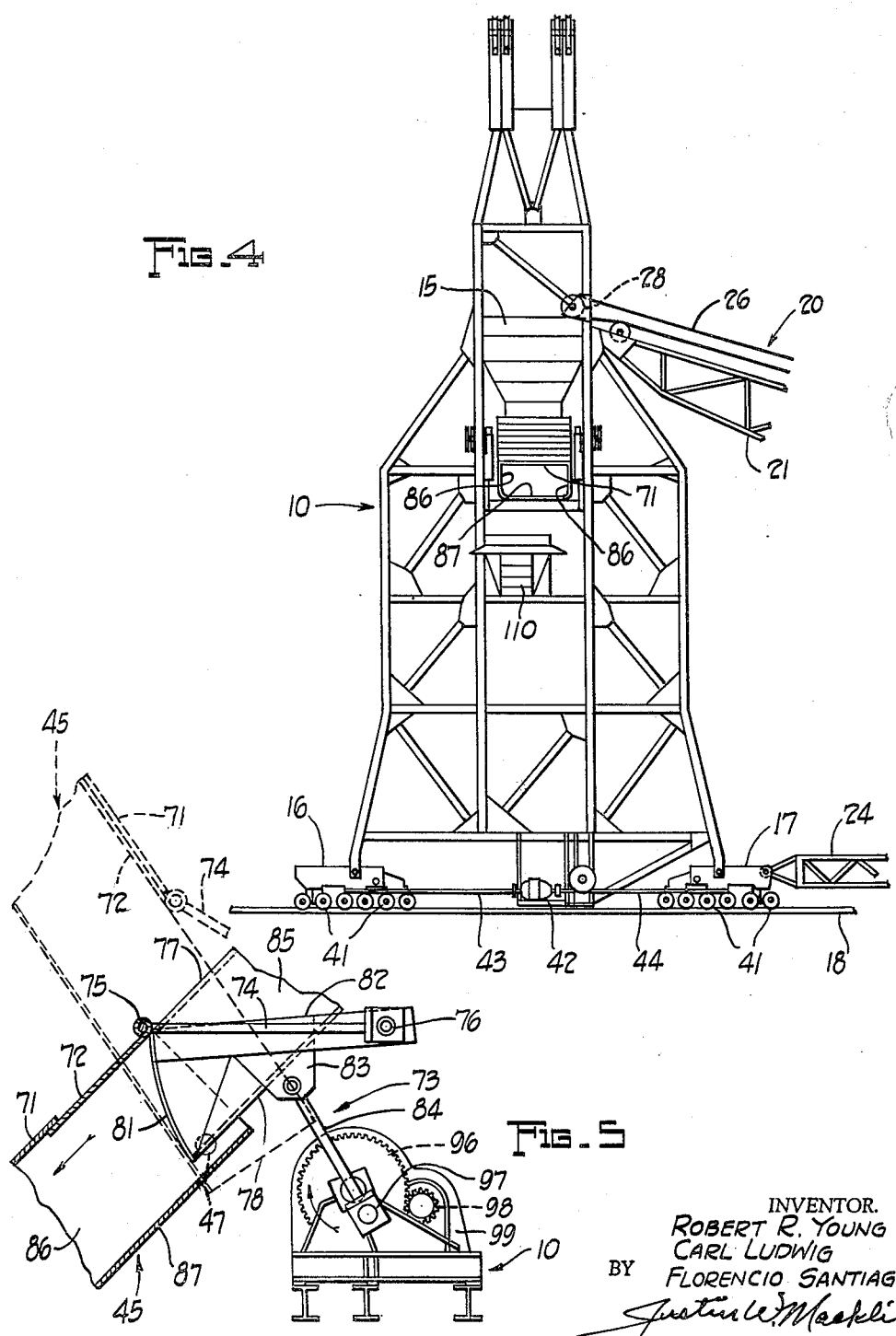

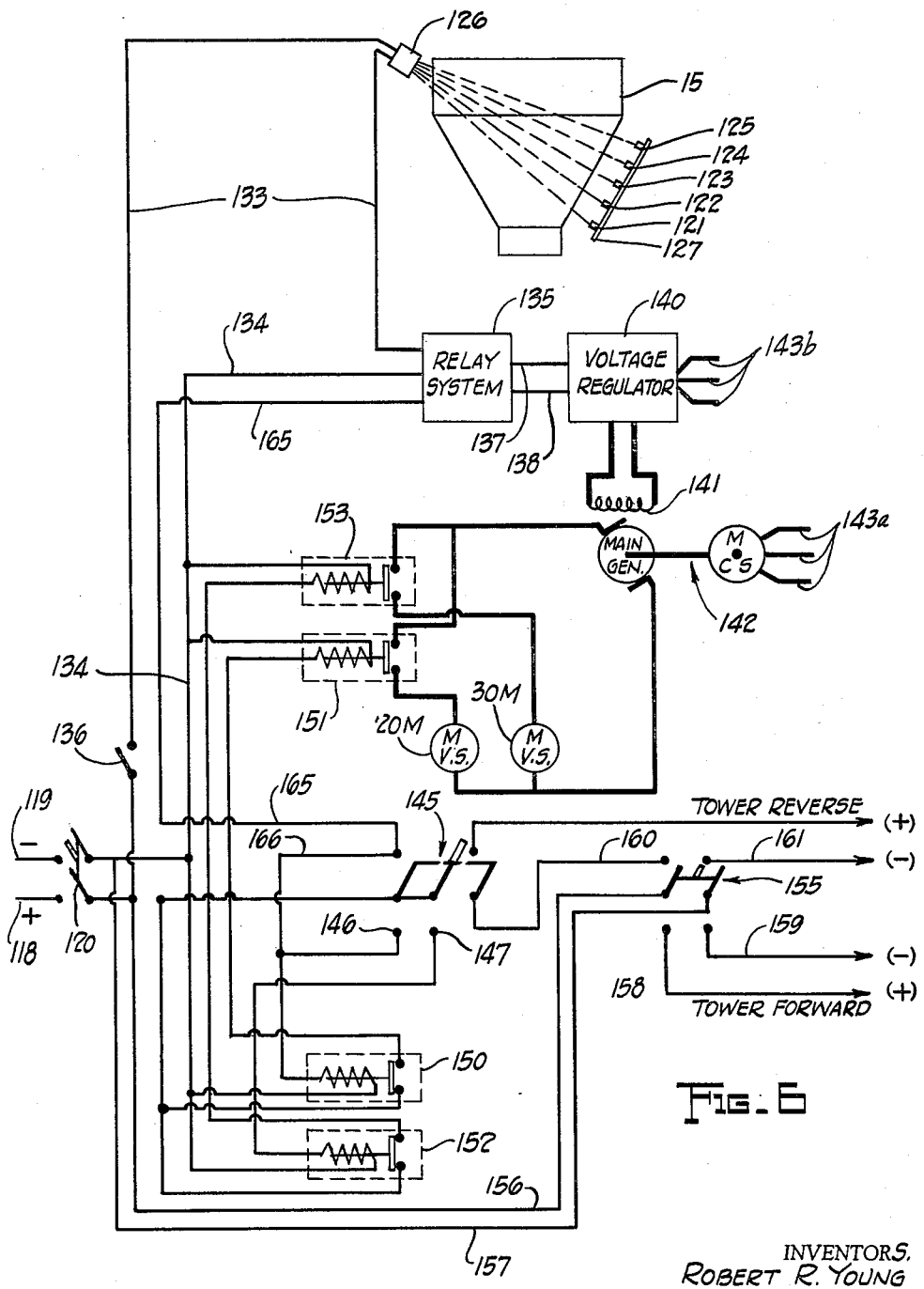

United States Patent Office 3,107,795
Patented Oct. 22, 1963

3,107,795
APPARATUS FOR LOADING BULK MATERIAL
Robert R. Young and Carl Ludwig, Cleveland, and Florencio Santiago, Cleveland Heights, Ohio, assignors to McDowell Company, Inc., Cleveland, Ohio, a corporation of Ohio
Filed Dec. 16, 1959, Ser. No. 859,914
8 Claims. (Cl. 214—14)

This invention relates to apparatus for loading bulk material into the holds of ships and for similar purposes, and particularly for loading such materials as coal, ores, and the like ranging in particle size from finely granular to relatively large lumps.

Although the apparatus of the invention has certain special advantages for handling lump material with care to minimize breakage of the lumps, other unique and advantageous features of the invention are of similar value in the handling of bulk material where breakage of lumps is a matter of little or no concern. Certain of the advantages are realized where the discharge point into the receptacle being loaded may remain at all times in a predetermined location, whereas other advantages are realized principally or entirely where substantial movement of the discharge point over distances of several hundred feet or more may be required.

A general object of the invention is to provide apparatus for the rapid movement of bulk material from a supply point into a receptacle, such as a ship's hold, with maximum economy of labor, plant investment, and power consumed.

Another general object of the invention is to provide apparatus for supplying bulk material to a loading chute or the like as rapidly as the chute can discharge the material without danger of exceeding the discharge capacity of the chute when the flow of material is accidentally retarded by jamming of the material or is purposely retarded or stopped as required from time to time during a loading operation.

A more specific object of the invention is to provide apparatus having the foregoing general economic and operational advantages and being also capable of travel along a quay or the like for discharging bulk material at any desired location along its path of travel, whereby, for example, holds distributed along the length of a ship may be filled in any desired order to maintain balance of the ship without the long delays that would be required if it were necessary to move the ship for this purpose.

Another specific object of the invention is to provide apparatus of the foregoing type having delivery means for discharging bulk material into the hold of a ship, the delivery means being mounted for travel back and forth alongside a ship from end to end thereof and also being readily movable to a withdrawn position for clearing above deck spars, high masts and other superstructures of ships while the apparatus is moved past the same from one hold to another.

Still another specific object of the invention is to provide substantially completely automatic controls for the movement of bulk material from a supply point during the loading of a single receptacle or ship's hold, so as to require minimum operator attention and reduce the dangers incident to human error resulting from carelessness, fatigue, or other causes.

Still another specific object of the invention is to provide apparatus of the foregoing character wherein the opportunities for the free fall of material being handled are kept to a minimum and handling of the material at all points in the system is accomplished as gently as possible, consistently with the requirements of rapid and efficient operation.

While the foregoing objects have been pursued heretofore with varying degrees of success, much room for further improvement has remained. By means of the present invention, substantial progress has been made toward achieving a more nearly ideal balancing of all of the mechanical and economic advantages referred to.

The foregoing objects and advantages of the invention will be more fully understood from the ensuing description of illustrative embodiments of the invention, taken in connection with the accompanying drawings. Referring to the drawings—

FIGURE 1 is a side elevation of the loading apparatus of the invention mounted on a dock or quay for operation at various positions along the length thereof;

FIG. 2 is a plan view of the loading apparatus of FIG. 1 and additionally shows a ship alongside the dock in position for loading;

FIG. 3 is an end elevation of the traveling tower and delivery means of the coal loading apparatus of the invention;

FIG. 4 is a side elevation of the tower of FIG. 3 with the delivery means thereof shown in section and a portion of the associated conveyor system also being shown, the view being taken as indicated by the line 4—4 in FIG. 3;

FIG. 5 is a somewhat diagrammatic view, partly in section, showing the relative arrangement and operation of a gate in the throat of a hopper on the tower for controlling the discharge of material therefrom into the upper end of the delivery means; and FIG. 6 is an electrical circuit diagram showing the basic elements of a suitable automatic control system for the loading apparatus.

Referring to FIGS. 1 and 2, the apparatus shown therein for illustrative purposes includes a traveling tower structure 10 of the "side wall traveler" type, the tower being mounted on trucks for travel on a pair of closely-spaced rails along one side of a pier 11, which may exist for other purposes and is used in this case as a convenient structure providing lateral support for the tower, as hereinafter described. Such a side wall traveler is relatively narrow transversely of its path of travel and, therefore, is adapted to receive its vertical support from a relatively narrow quay or dock 12 running alongside the pier 11 at a lower level to provide berth facilities for one or more ships 13 along the pier.

As indicated generally in FIG. 2, the tower 10 has mounted thereon a bulk material delivery means 14 projecting laterally out from the tower over the deck of a ship. As shown in more detail in FIG. 3 and described hereinafter, this delivery means is also operative to project downwardly into the hold of a ship and is adjustably movable relative to the tower and the ship in a well known manner to facilitate its entry through a hatch and movement therein as required for the proper distribution of the material discharged therefrom. As indicated in phantom outline, the delivery means is also adapted to be raised upwardly about a pivotal connection with the tower 10 to a position in which it will clear masts and other high superstructures of a ship as the tower is being moved along the quay from hold to hold of the ship. This is important in the case of most ocean-going cargo ships, which generally have superstructures of considerable height along the length of the ship between hatches.

There is also mounted on the tower 10 (in this case at a higher level than the material-receiving end of the delivery means 14) a funnel-like hopper or surge bin 15 for feeding the material into the delivery means from a belt conveyor system. This hopper 15 is rigidly mounted on the tower 10 in a fixed location. Its capacity is determined, not by its material feeding function, however, but rather by its special function of accumulating bulk material discharged from the conveyor system into the hopper while the tower is being moved in one direction and while the bottom of the hopper is closed to the flow of material into the delivery means, as hereinafter explained.

In order that the tower 10 may travel along the quay 12, as mentioned above, it is mounted on equalized power trucks 16 and 17 having a suitable number and arrangement of wheels to support the weight of the tower on a pair of closely spaced rails 18 (shown as a single line in FIG. 1). The rails 18 run along the quay 12 parallel to the pier 11, for the distance required to permit the tower 10 to travel an extreme inshore position, shown in solid lines in FIGS. 1 and 2, to an extreme position, outwardly along the quay, shown in phantom outline in FIGS. 1 and 2.

Associated with the tower 10 for travel therewith is an inclined belt type conveyor 20 carried on a suitable, inclined, structural framework 21, supported by wheeled truck 22. The conveyor 20 serves to move material from a relatively low level above the dock 12 to a point above the hopper 15 on the tower for discharging its burden into the hopper. For securing the conveyor 20 to the tower 10 in fixed relationship therewith and with the hopper 15, the upper end of the conveyor framework 21 may be connected directly to the tower at 23, and the truck 22 of the conveyor framework may be connected to the tower truck 17 by a suitable brace 24. The truck 22 for the inclined conveyor 20 may run on the same rails 18 as the tower trucks 16 and 17. The inclined conveyor 20 may suitably comprise an endless belt 26 running around a lower idler pulley 27, along an upper reach to an upper head pulley 28, around the head pulley to a belt-tensioning or take-up and drive mechanism 29, and back to the lower idler pulley 27.

The lower end of the inclined conveyor 20 receives its burden from a long dock conveyor 30. As shown in FIGS. 1 and 2, the dock conveyor 30 may comprise a long endless belt 31 running about a fixed idler pulley 32 disposed below any suitable material feeding device 33 at a point remote from the tower. From the idler pulley 32, the upper reach of the belt 31 runs in the direction of the inclined conveyor 20 to a movable transfer or tripper mechanism 35, which discharges the burden of the belt 31 of the dock conveyor onto the belt 26 of the inclined conveyor 20.

As is well understood in the art, the tripper mechanism 35 may comprise a framework 36 on which suitable pulleys are mounted for guiding the belt 31 forwardly and upwardly about a reversing head pulley, and then downwardly and in a rearward direction about another reversing pulley, and then forwardly again on a horizontal reach as far as required to accommodate the travel of the tower 10 and associated inclined conveyor 20. The framework of the tripper mechanism 35 and the adjacent lower end of the framework of the inclined conveyor 20 are rigidly tied together and suitably supported on respective sets of wheels and tracks in a conventional manner (not shown in detail) for travel together with the tower 10. Travel of the tripper mechanism 35 shifts the discharge point of the dock conveyor belt 31 along this belt as required to keep it in proper position relative to the correspondingly traveling inclined conveyor 20 onto which the material from the dock belt is transferred.

The upper reach of the dock belt, at its forward end, runs around a driven head pulley 37, around the pulleys of a belt-tensioning or take-up mechanism 38, and back along a lower reach to the idler pulley 32 below the material feeding device 33.

The head pulleys 28 and 37 for the two conveyor belts 26 and 31 are respectively driven by variable voltage direct current motors and suitable gear boxes (not shown in FIGS. 1 to 4). These motors are shown in the circuit diagram of FIG. 6, the drive motor for the inclined conveyor 20 being designated 20M and the drive motor for the dock conveyor 30 being designated 30M. The gearings in the gear boxes for the two motors are selected so that these motors may be driven by the same applied voltage while driving the two conveyors at substantially the same speeds. Any difference in the speeds of the belts 26 and 31 should normally be such that the inclined belt 26 moves slightly faster than the dock belt 31, assuming that they are of the same width or capacity, to insure that the latter will not overload the former onto which it discharges.

The material feeding device 33, shown diagrammatically as a hopper discharging from a restricted bottom outlet onto the dock conveyor 30, may be any desired type of flow regulating device for controlling the feed of bulk material onto the conveyor belt 31 so as to maintain a substantially uniform burden thereon, regardless of changes in conveyor speed. In this manner, the speeds of the two conveyors may be simultaneously varied, as hereinafter described, without altering the burden on the conveyors. The purpose of this is to render the amount of material carried by the conveyors to the tower 10 substantially directly proportional to the conveyor speeds, which are varied as hereinafter described.

In the case of a simple hopper feed onto the dock conveyor 30, a conventional shaker mechanism or the like may be located below the hopper 33 and above the conveyor belt 31 at 39 to insure continuous flow of lump material from the hopper. Such a mechanism may include a level limiting rake 40 or the like to rake the material on the belt 31 down to a uniform depth as it is carried away. In the case of finely granular material, a shaker mechanism may not be necessary to insure the required continuous flow. As an alternative to a simple hopper feed, the conveyor 30 may receive its feed from still another conveyor or series of conveyors controlled to maintain the desired uniform loading of the belt 31 as its speed is varied.

Referring in more detail to the structure of the apparatus components as shown in FIGS. 3, 4, and 5, the tower 10 may consist of any suitable structural framework for carrying the loads imposed thereon. The wheels 41 for the tower trucks 16 and 17 are preferably of the double flange type for running on the closely spaced rails 18. Any desired number of these wheels on the two trucks 16 and 17 may be driven by a motor 42 through oppositely directed drive shafts 43 and 44 and suitable gearing (not shown) on the trucks 16 and 17.

As best shown in FIG. 3, the delivery means 14 is of a generally conventional type comprising a normally inclined pan structure 45 mounted rigidly on and supported by a normally inclined boom 46 having its upper end pivotally connected to the tower 10 for pivotal movement about a horizontal axis 47 parallel to the quay 12. The lower end of the pan structure 45 discharges into the upper end of a normally substantially vertically disposed telescopic chute 48 that hangs from the pan structure for pivotal movement relative thereto about a pivot 49 having a horizontal axis parallel to the quay 12. The lower or outer end portion 51 of the boom 46 extends generally outwardly beyond the chute 48 to provide supporting structure for a pulley 52 employed in raising and lowering the boom about its pivotal connection to the tower, and for three pulleys 53, 54, and 55 employed in swinging the telescopic chute 48 about its pivotal connection to the plan structure 45.

A cable system 56 runs about the boom pulley 52, upwardly to the top of the tower 10 and about pulleys 57, 58, and 59 to a suitable drum and drive mechanism (not shown) mounted on the tower 10 for swinging the boom from an extreme, upper, withdrawn position indicated in phantom outline in FIG. 3, to a lowermost operating position approximately as shown in solid outline. Another cable system 61 runs about a pair of pulleys 62 and 63 on the telescopic chute 48 toward its lower end, about the pulleys 53, 54, and 55 on the lower outer end portion 51 of the boom, and about pulleys 64 and 65 to suitable drums 66 and 67 and associated drive mechanisms (not shown) mounted on the tower 10 for swinging the telescopic chute about its pivotal connection to the pan 45. These cable systems and drive mechanisms therefor are generally conventional in the art and need not be shown or described herein in detail.

Referring to the pan structure 45 in somewhat more detail, it is supported on and manipulated by the boom 46 (FIG. 3), and, as shown in FIG. 4, in transverse section, it includes a top plate or cover 71 as well as side plates 86 and a bottom plate 87, so that the pan and telescopic chute 48 form a continuously enclosed chute capable of holding a solid column of bulk material from the bottom to the top thereof, when desired. As shown in FIGS. 3 and 5, the pan structure extends upwardly to the throat of the hopper 15 and substantially into registry therewith for receiving bulk material discharged therefrom. The top plate 71 of the pan structure stops short of the upper end thereof, and a sliding cover plate 72 completes the top closure of the pan up to a gate mechanism, mounted on the hopper throat and generally designated 73, the gate mechanism being operative for opening and closing the discharge throat of the hopper 15.

The pan structure and gate mechanism are shown in solid outline in FIG. 5 with the pan in its lowered position and the gate closed. The sliding cover plate 72 and the gate mechanism 73 are designed to permit the pan to be swung upwardly to its phantom outline position, shown both in FIG. 3 and FIG. 5, about the axis 47 of its pivotal connection to the tower 10, with the gate either open or closed, and to permit the gate to be opened and closed with the pan in any position. The uppermost position of the pan and the open condition of the gate mechanism are shown in phantom outline in FIG. 5. As best shown in FIG. 5, the throat structure of the hopper, comprising top and bottom plates 77 and 78 and side plates 85 (only one being shown), extends partially into the upper end of the pan structure 45. The side plates 85 and bottom plate 78 of the hopper overlap the side plates 86 and bottom plate 87 of the pan structure.

The gate mechanism 73 comprises a gate 81 in the form of a segment of a cylinder positioned for opening and closing the hopper throat. The gate 81 is disposed to clear the sliding cover plate 72 of the pan structure 45 when raised to open position. When closed it extends entirely across the hopper throat opening from side plate to side plate and top plate 77 to bottom plate 78 of the throat portion of the hopper. The gate is swingably mounted on the outer ends of a pair of arms 82 that straddle the throat portion of the hopper between the cover plate arms 74. The inner ends of the gate arms 82 are connected to the tower 10 for pivotal movement relative thereto about the same pins 76 on which the cover plate arms 74 are pivoted. Each gate arm 82 has a transverse extension plate 83 rigidly secured thereto and pivotally connected to the upper end of an actuating arm 84.

The gate actuating arms 84 on opposite sides of the hopper are pivotally connected at their lower ends to respective crank wheels 96 mounted on a crank shaft 97. One of the crank wheels 96 is geared at its periphery to a pinion 98 driven by a reversible motor 99 by which the gate mechanism is operated. The crank wheels 96, shaft 97, pinion 98, and motor 99 may be mounted directly on the tower structure 10.

The above-described relationship of the various parts of the pan structure, hopper, and hopper gate mechanism permit the pan to be raised and lowered independently of the position of the hopper gate and without interference with the hopper. As will be apparent, the gate may be opened and closed independently of the position of the pan by a reversible motor control switch (not shown), preferably located in the operator's cab (described below).

By means of the conveyors 20 and 30 and the hopper gate mechanism 73, control is exercised over the flow of bulk material from the source 33 to the hopper 15 on the tower 10 and from the hopper 15 into the delivery means 14. The discharge of bulk material from the delivery means 14 may be controlled in a generally conventional manner by a hydraulically operated gate 100 at the lower end of the telescopic chute 48, and by a motor 101 adapted to rotate the entire lower end portion 102 of the telescopic chute for directing the flow of bulk material. This portion of the apparatus of the invention, being suitably constructed in any of a variety of ways long practiced in the art, is not shown in detail in the drawings.

In addition to the gate 100 at the lower end of the telescopic chute 48, it is desirable for many purposes to employ a trimmer, such as the one indicated at 105. The particular type of trimmer indicated in the drawings is a belt trimmer adapted to receive bulk material at a rate determined by the opening of the gate 100 and to accelerate it while moving it generally horizontally along a short, variable speed, endless belt conveyor to the discharge end 106 thereof, from which it is discharged. The trimmer thereby throws the bulk material horizontally, as is often required to load holds under decks providing only limited hatch areas to receive the lower end of the telescope chute. As indicated by the phantom outline position of the trimmer 105 on the raised delivery means in FIG. 3, the trimmer mechanism as a whole is movably mounted on the telescopic chute by a pair of arms 107 for adjusting its position and inclination in use and for swinging it to a completely inoperative storage position when its use is not desired or while the entire delivery means is raised to its uppermost position. Trimmers of this general type are in common use, and a particularly desirable form thereof is described and claimed in a patent of Carl Ludwig, No. 2,988;201, granted June 13, 1961.

Control over the various components of the conveyor and delivery means and associated mechanisms described above is preferably exercised primarily from an operator's cab 110 on the tower structure 10. The cab 110 should be located so as to give an operator therein a substantially unobstructed view down into the hold of a ship 13 while the delivery means is being moved into and out of the hold and while it is being manipulated therein during a loading operation. By locating the cab just below the boom 46, the boom does not obstruct this view, and the operator is close enough to the deck of the ship to control the movement of the delivery means with confidence in his visual observation. Preferably, dual controls are provided for complete control of the trimmer and rotation of the lower end 102 of the telescopic chute, the second set of controls being mounted in a control box 111 with electrical leads for these controls running through a cable 112 by which the box may be suspended so that it can be held in the hands of a second operator standing on the deck of the ship 13 besides the hatches through which the lower end of the telescopic chute is successively projected during a loading. Desirably, such a deck operator also carries a suitable telephone instrument (not shown) for communicating orally with the cab operator and with a third operator at the source 33, both of the latter being provided with similar instruments, and the three instruments being interconnected for three-way conversation.

The cab controls for raising and lowering the boom 46, raising, lowering, and swinging the telescopic chute 48, rotating the lower end thereof, operating the trimmer 105, and effecting travel of the tower 10 along the tracks 18, may have independent controls conveniently located in the cab 110 in any of various conventional arrangements for manipulation by the cab operator. These details constitute no part of the present invention and need not be shown or described. In addition, the cab operator is provided with appropriate, conventional controls for the gate operating motor 99 so that he may open and close the hopper gate 81. Since these controls may be of any suitable conventional type, they also need not be shown and described. As will be understood by those skilled in the art, limit switches are also desirably employed in the various control circuits referred to above to prevent overrunning of the various moving parts that are reversibly operable between predetermined extreme positions.

Although, according to the present invention, the operation of the inclined conveyor 20 and dock conveyor 30 is automatic, certain switches for putting the automatic conveyor control system into operation are obviously required and are suitably also located in the cab 110 for manual actuation by the cab operator. Although the automatic control circuit may utilize any of various modern electrical systems for sensing mechanical effects, conveying responsive signals to appropriate control points, and receiving and utilizing those signals to control the conveyors 20 and 30, only the necessary, basic elements of a suitable control system, for the sake of simplicity, are disclosed in the circuit diagram of FIG. 6 to illustrate the control system of the present invention.

Referring to the circuit diagram of FIG. 6, the control circuit shown therein may be supplied with direct current power by a pair of conductors 118 and 119 having a double pole switch 120 interposed therein. The tower hopper 15 is equipped with a level sensing system comprising a plurality of ultra-short wave radiation sources 121, 122, 123, 124, and 125 disposed substantially as shown along one side of the hopper. Each of these radiation sources may consist of a lead-lined housing containing a gamma ray emitting substance such as radioactive cobalt (the isotope Co–90), and having a restricted opening facing toward a Geiger tube type of detector 126 or the like, mounted substantially in the location shown on the opposite side of the hopper from the five radiation sources. As will be appreciated, the types of ultra-short waves that are equivalent for the purposes of this invention include X-rays and the like, but gamma ray sources are more conveniently used than X-ray sources for these purposes. The radiation sources may be mounted on any suitable support 127, which may be carried either by the hopper 15 itself or by the lower structure 10, each radiation source being oriented to focus radiation escaping from the opening of its housing through the walls of the hopper toward the detector 126.

The detector 126 may be mounted in any desired manner, either on the hopper itself or on the tower structure. Its function is to vary the voltage applied to a control circuit conductor 133 running from one of the pair of control circuit power lines 118 and 119. The detector 126 is interposed in the conductor 133, which continues on to a relay box 135 including a suitable amplifier (not shown). The other power line 119 is connected by the conductor 134 to the relay box 135. A switch 136 is desirably interposed in the conductor 133. A pair of conductors 137 and 138 connect the relay box 135 to a conventional voltage regulator 140, such as a motor-operated rheostat. The voltage regulator 140 is connected to the field winding 141 of a main motor-generator set 142, and to the field windings 141 through the voltage regulator 140, may be supplied by the three-phase alternating current supply lines 143a and 143b, respectively.

As will be apparent from FIG. 6, the accumulation of bulk material in the hopper 15 to a gradually rising level therein will cause an increasing amount of radiation from the gamma ray sources 121–125 to be intercepted by the bulk material. This will reduce the radiation reaching the detector 126 and, consequently, will reduce the control voltage to the relay box 135 at a rate that is dependent upon the opacity of the particular bulk material to gamma rays. In the case of coal, for example, this opacity is nearly 100% where the mass of coal is of substantial thickness, as would be true in the hopper 15. By properly calibrating the bin level sensing system for the particular bulk material being handled, the change in the control voltage to the relay box 135 can be employed to operate suitable relays (not shown) in the relay box 135 for operating the voltage regulator 140 to vary the voltage to the field windings 141 and, hence, the voltage output of the main motor-generator set 142 inversely with variation in the height of the bulk material level in the hopper 15. This control system is preferably designed and adjusted so that the voltage output of the main motor-generator set 142 will be at its maximum when the level of bulk material in the hopper 15 is below the level at which any radiation will be intercepted thereby, and so that the voltage output of the main motor-generator set will drop through one or more steps to zero when the level of bulk material in the hopper 15 rises high enough to intercept all of the radiation which would otherwise reach the detector 126. This automatic change in the voltage output of the main motor-generator set 142 is used to correspondingly control the speed of the motors 20M and 30M and, hence, the speed of the conveyors 20 and 30, by means of any suitable electrical control circuit capable of functioning substantially as indicated by the balance of the circuit shown in FIG. 5, described hereinafter.

The entire control circuit of FIG. 6 may first be activated by closing the switch 120 in the control circuit power lines 118 and 119. This connects the incoming control circuit power line 119 to various components of the circuit as shown. The switch 136 may then be closed to activate the detector 126, which should be done long enough in advance of use of the system to permit the detector to warm up, e.g., 30 minutes or so.

For normal operation of the conveyors 20 and 30 to supply bulk material to the hopper 15, a double throw switch 145 preferably located in the operator's cab 110, is then thrown to connect incoming power line 118 to a terminal 146 and to a terminal 147. The results of throwing the switch 145 in this manner are as follows:

(1) The solenoid of a relay 150 is energized to close the switch thereof, thereby energizing the solenoid of a relay 151 to close the switch thereof in the power circuit from the main motor-generator set 142 so as to supply power to the motor 20M for the inclined conveyor 20.

(2) The solenoid of a relay 152 is energized to close the switch thereof, thereby energizing the solenoid of a relay 153 to close the switch thereof in the power circuit from the main motor-generator set 142 so as to supply power to the motor 30M for the dock conveyor 30.

The net effect of the above is to start both the inclined conveyor 20 and the dock conveyor 30. So long as the level of bulk material in the hopper 15 does not rise appreciably above the outlet throat thereof, the detector 126, relay system in the box 135, and voltage regulator 140 will maintain the maximum voltage across the field 141 of the main motor-generator set 142, thereby maintaining maximum voltage to and maximum speed of the two conveyor motors 20M and 30M.

If the level of bulk material in the hopper 15 should rise, so as to intercept more and more of the radiation from the sources 121–125, the detector 126 will proportionately reduce the voltage to the relay system in the box 135. The relay system in the box 135 will in turn operate the voltage regulator 140 to reduce the voltage to the field 141 of the main motor generator set 142 so as to correspondingly reduce the voltage to the motors 20M and 30M and thereby correspondingly reduce the speed of the conveyors 20 and 30. If this conveyor speed reduction should not suffice to stop the rising of bulk material in the hopper 15 before it reaches the level of the highest radiation source 125, then, when the bulk material reaches that level, the speed of the conveyors will be dropped to zero to halt any further rising of the level. Subsequent falling of the level of bulk material in the hopper 15 will similarly actuate appropriate relays in the box 135 to restart and/or accelerate the conveyors 20 and 30 so that they reacquire their maximum speed only after the level of bulk material has dropped to or below the level of the lowermost radiation source 121.

As will be obvious to those skilled in the art of electrical controls, any of a number of relays may be employed in the box 135 to effect a desired number of speed change steps as the level of bulk material slowly rises or falls in the hopper 15. Such a relay system is preferably selected and adjusted to keep the level of bulk material from dropping below the bottom of the hopper 15 when the gate 100 at the bottom of the telescopic chute 48 is partially closed, but just enough to keep the rate of discharge from the telescopic chute slightly below the maximum delivery capacity of the belt system. In order to attain the maximum possible rate of loading of bulk material, however, when breakage of the bulk material is of no concern, the opening of the throat of the hopper 15, the feeding capacity of the pan structure 45 and telescopic chute 48, and the size of the opening controlled by the gate 100 should be large enough to discharge material at a rate somewhat exceeding the delivery capacity of the belt system when the gate 100 is wide open. Also, the trimmer 105 is preferably designed to handle bulk material at a rate at least equal to the delivery capacity of the belt system.

Referring further to the mechanics of the conveyor speed changes effected as described above, they were denominated as speed change steps, which are automatically effected as the level of bulk material slowly rises or falls in the hopper 15. This is not to be construed as meaning that the speed changes in abrupt steps, or that this would be desirable. Where the voltage regulator 140 is a conventional motor operated rheostat, it will and desirably does require an appreciable increment of time to effect a speed change in response to the action of the relay system by which it is controlled. This increment of time, for example, might be of the order of twenty to twenty-five seconds or so to run from stop to full speed or from full speed to stop, and a proportionate part of such time would be required, of course, for effecting a lesser speed change. Since the rapidity with which the level of bulk material may change the hopper 15 will vary widely according to the circumstances, distinct steps of speed change (each step being a progressive one over a finite time period) will not necessarily occur. For example, if the level in the hopper is changing rapidly, it may call for a second increase in conveyor speed before a speed increase previously called for has been completed. In this case, the second speed change would merely be a progressive continuation of the preceding one. On the other hand, if the hopper level is changing slowly, there may be substantial periods of constant conveyor speeds between successive speed changes. In any event, whether the speed is caused to change progressively, either continuously or stepwise, or, a type of voltage regulator is used which will cause relatively abrupt, stepwise speed changes, the changes in speed are opposite in sign to the changes in level of material in the hopper by which such speed changes are initiated. In other words, the conveyor speeds are caused to vary inversely with variations in the level of bulk material in the hopper. Because of the same considerations discussed above, it will also be recognized that the rate of conveyor speed change relative to the rate of level change in the hopper will not normally be a constant and will not necessarily follow a repetitive pattern.

As a safety measure, if desired, the relay system in the box 135 may be designed and connected so that, when it operates the voltage regulator 140 to reduce the voltage across the field windings 141 to zero to prevent overflow of the hoper 15, it will also interrupt the power circuit to the armatures of the motors 20M and 30M and require that the circuit be manually reset to restart the conveyors 20 and 30. Such a safety provision, like the many other controls for powered components of the machine as a whole, including limit switches, interlocks, and the like, that are desirable for safety of operation of the various operating parts, does not constitute a feature of the invention to which this specification is directed. All such details may be supplied by those skilled in the art according to known principles of good design, and are not shown or described herein in the interest of greater simplicity and clarity of the disclosure of the features of the invention for which protection is sought.

However, an important additional feature of the invention involves operation of the inclined conveyor 20 when the tower 10 is moved toward the loaded reach of the dock conveyor 30 (from the position shown in phantom outline to the position shown in solid outline in FIG. 2). For convenience, this may be considered as "reverse" travel of the tower 10, whereas travel of the tower in the opposite direction may be considered as "forward" travel thereof.

During forward travel of the tower 10 and of the attached inclined conveyor 20 and tripper mechanism 35 (the conveyors 20 and 30 being idle), both of the conveyors 20 and 30 may be loaded with coal from the top of the inclined conveyor back to the source 33. Forward travel of the tripper mechanism merely extends the load-carrying reach of the dock conveyor in the forward direction, leaving the extended portion thereof unloaded. Rearward travel of the tower 10, inclined conveyor 20, and tripper mechanism 35, however, shortens the loaded reach of the dock conveyor 30, dumping bulk material therefrom onto the inclined conveyor 20 as this travel continues. Therefore, it is necessary to run the inclined conveyor 20 at least as fast as the loaded reach of the dock belt is shortened in order to carry bulk material away as it is dumped thereon. If this should not be done, the coal dumped from the dock belt at the upper end of the tripper mechanism as the latter travels in reverse would spill off the sides of the idle inclined conveyor belt and onto the dock 12.

In view of the above, the control circuit of FIG. 6 is provided with an interlock that prevents reverse travel of the tower 10 unless the dock conveyor 30 is idle and the inclined conveyor 20 is running at a predetermined speed at least equal to that of the tower. As shown in FIG. 6, a manually operated, double pole, double throw switch 155, preferably located in the operator's cab 110, may be employed for energizing the tower travel motor 42, forwardly when this switch is thrown in one direction and rearwardly when it is thrown in the opposite direction. Power to this switch, for selectively operating a tower reverse relay (not shown), is provided by conductors 156 and 157 respectively connected to the direct current power lines 118 and 119 on the cold or load side of the main switch 120. The switch 155 is thrown in one direction to apply a potential between a pair of conductors 158 and 159 for actuating the relay in the power circuit of the motor 42 to drive the tower in the forward direction. The switch 155 is thrown in the opposite direction, to apply a potential between a second pair of conductors 160 and 161 for actuating the relay in the power circuit of the motor 42 to drive the tower in the reverse direction. However, the conductor 160 is interrupted by one component of the triple pole, double throw switch 145 whenever this switch is in its open position, with the conveyors idle, or is in one of its closed positions in which the conveyor motors 20M and 30M are connected for normal, automatic operation as described above. Thus, in both of these situations, the circuit for energizing the motor 42 to drive the tower in reverse is disabled.

When the switch 145 is thrown in the opposite direction, it removes the discontinuity in conductor 160 and renders operative the circuit for energizing the motor 42 to drive the tower in reverse. At the same time, the switch 145 connects the positive power line 118 to a conductor 165, which leads to an additional component of the relay system in the relay box 135 (also connected to the negative power line 119 through the conductor 134). By means of this component of the relay system, the voltage regulator 140 is set to adjust the output voltage of the main motor-generator set 142 to a predetermined value, selected to operate the conveyor 20 at the relatively low speed at which the tower is driven by the motor 42.

When the switch 145 is thrown to activate the tower reverse circuit and to energize the last-mentioned component of the relay system in the box 135, it also energizes, through a conductor 166, the solenoid of the relay 150 in the starting circuit for the motor 20M, but without energizing the solenoid of the relay 152 in the starting circuit for the motor 30M. This starts the motor 20M in the same manner described above and drives the inclined conveyor 20 at the required relatively slow speed (predetermined as described above) to carry to the hopper 15 any bulk material already on this conveyor and the additional material that is discharged onto this conveyor upon reverse travel of the tower. During such operation, the hopper gate 81 may be closed to retain the coal carried to the hopper and prevent it from flowing into the delivery means, which may be partially or fully raised.

As will be apparent from the foregoing, the interlock between the switches 145 and 155 permits the tower to be moved in the reverse direction only when the switch 145 is thrown to operate the inclined conveyor 20 while disabling the starting circuit for the dock conveyor 30 and insuring that the latter will remain idle during reverse travel of the tower. As should also be apparent, this protective interlock is not dependent for its effectiveness upon the order in which the switches 145 and 155 are thrown to effect reverse travel of the tower, and it does not prevent forward travel of the tower, whether the conveyors 20 and 30 are both stopped or are both in normal operation. Also, this interlock in no way interferes with normal automatic operation of the conveyor speed control system, which will still provide an emergency stop for the inclined conveyor 20 if, through some error, the hopper 15 should fill up during reverse tower travel. Because the conveyor 20 need only run relatively slowly to match or exceed the rate of tower travel, its speed in this case should not have to exceed the slowest speed that would be called for by the automatic control system, which, therefore, will not affect the speed of this conveyor although it will still operate to effect the emergency stopping of the conveyors if the hopper 15 should become full, as described above.

The amount of bulk material carried to the hopper 15 during reverse travel of the tower may be as great as the total normal load of the inclined conveyor 20 plus total normal load of the dock conveyor over the portion of its load carrying reach between the extreme forward and extreme rearward positions of the tripper 35 shown in FIG. 1. As indicated above, therefore, the capacity of the hopper 15 must be at least sufficient to receive and hold this amount of material while the discharge of material therefrom is interrupted.

It is contemplated that the hopper 15, during a loading operation, will normally be maintained nearly full by the automatic belt control system, particularly if breakage of the bulk material while it is falling into the hopper is to be kept to a minimum. Therefore, both to facilitate closing the hopper gate 81 and to provide room in the hopper to receive more bulk material from the conveyor 20 during reverse travel of the tower, the operator in the cab 110 should throw the switch 145 to stop both conveyors in time to empty at least the hopper 15 before interrupting the discharge of material from the telescopic chute, if movement of the tower in reverse and/or raising of the delivery means 14 will be required during such interruption. Also, if the delivery means must be raised, and particularly if the telescopic chute 48 is also to be telescoped, the entire delivery means should first be emptied. In this case, the conveyors should be stopped in time to empty the entire delivery means before discharge from the telescopic chute is interrupted.

However, if substantial raising of the delivery means and shortening of the telescopic chute are not required to clear obstacles which would otherwise interfere with reverse travel of the tower, it is obviously unnecessary to empty both the pan 45 and telescopic chute 48 in preparing for such reverse travel. After stopping the conveyors to permit the hopper 15 to empty, the operator in the cab 110 can recognize the empty condition of the hopper by the change in sound directly above him as the flow of material from the hopper into the pan ceases and the flow of material over the bottom of the pan diminishes as the coal level therein drops to a point near the top of the telescopic chute. Alternatively, if desired, any suitable indicating system (not shown) may be employed to inform the operator of the empty condition of the hopper 15. He can then close the gate 100 at the bottom of the telescopic chute so as to terminate the discharge of material therefrom while it is still at least substantially full.

From the foregoing description of an illustrative embodiment of the invention, its mode of operation will be apparent to those skilled in the art and need only be briefly summarized.

With the switches 120 and 136 closed, the tower 10 is positioned by the operator in the cab 110 by means of the tower travel control switch 155 (and interlocked switch 145, when necessary as explained above). The delivery means 14 and trimmer 105 are positioned by this operator in a conventional manner, and the trimmer is started (if positioned for use). Thereupon, the switch 145 is thrown for normal, automatic operation of the conveyors to bring them up to full speed and to control their speed thereafter. With the telescopic chute gate 100 closed to first fill this chute and the boom pan 45 (if breakage is to be minimized), and with the hopper gate 81 open, the operator in the cab 110 calls on his phone to an operator at the source 33, requesting him to start the feeding of material onto the dock conveyor 30. Coal will then be fed into the hopper with the conveyors continuously running at full speed unless and until automatically slowed down as described above. The gate 100 may be opened to start the discharge therefrom when the coal level has risen into the pan 45 or at any time thereafter.

The discharge rate may be regulated by means of this gate 100, and subsequent manipulation of the boom, telescope, and trimmer may all be handled in a conventional manner as required. The feeding of the coal to the delivery means will continue or stop as required under automatic control until interrupted by throwing of the switch 145 to its open condition, or through its open condition to its position for permitting reverse tower travel. In either case, both conveyors 20 and 30 stop, and the inclined conveyor 20 is restarted only if the switch 145 is so operated. Whenever the tower is to be moved in reverse, the hopper gate 81 should, of course, be closed so as to retain in the hopper the coal which is delivered to it during reverse travel of the tower. The hopper gate 81 may be opened again as soon as reverse travel of the tower is stopped, provided only that the boom is lowered to permit the contents of the hopper to flow into the delivery means.

When the apparatus of the invention is used to load an open barge or open hold of a ship, so that the operator in the cab 110 can clearly observe the loading conditions at all times, only this one operator and an operator at the source 33 are required to handle the entire operation from the source 33 to the ship. Otherwise, at most, one additional operator on the deck of the barge or ship is required for controlling the trimming of the coal by means of the controls on the control box 111, and for telephoning instructions to the operator in the cab 110 for manipulating the boom and telescope according to conditions which cannot be clearly observed by the latter.

By means of the control system of the present invention, the telescopic chute 48 and pan structure 45 may be safely and effectively kept full during normal operation so as to maintain a solid column of material moving downwardly therein without any free fall, which would cause excessive breakage of lumps of the material. At the same time however, the pan structure on the boom need not be enlarged to provide a reservoir for this purpose, nor is it necessary to provide a large capacity hopper 15 on the tower 10 for receiving large quantities of coal at intervals from a high lift car dumper or the like and for serving as a large reservoir or surge bin supplying the delivery means between successive replenishing steps. With only a relatively small hopper 15, immovably carried on the tower 10, and a delivery means of minimum dimensions for the required rate of flow of material, the desired careful handling of the material may be achieved with a minimum weight of movable and stationary apparatus and bulk material weight required to be supported by the tower. This means that all parts of the delivery means, its supporting boom and operating equipment therefor, hopper, and tower structure may be made lighter in weight and at substantially less cost.

Not only are the operator manpower requirements reduced to a minimum, as indicated above, but, also, the demands upon the single tower operator are reduced by relieving him of practically all responsibility for control of the flow of material to the tower. The automatic control of this flow of material to the tower avoids dangers due to human errors in manual flow control systems and permits the single tower operator to concentrate his attention more effectively upon accurate control of the boom and telescope. This aids him in depositing the material more accurately in a ship or the like according to its loading requirements and in avoiding accidental bumping of any part of the delivery means against any part of the ship, to say nothing about minimizing operator fatigue by reducing his responsibilities.

Along with the foregoing, the apparatus of the invention may be scaled up or down as required to adapt it to any desired rate of loading that could practically be accomplished with a single tower and delivery means.

In the light of the above comments and preceding description of the invention, it should also be apparent that the invention is admirably designed to accomplish the other objects and advantages set forth in detail in the introductory portion of the specification. Combining the various components of the invention in their cooperative relationship, as disclosed herein, achieves a more nearly ideal balancing of all of the desirable features of an efficient and economical loading system than has heretofore been achieved, while also producing a system adaptable for use in practically any physical loading environment likely to be encountered.

Although the invention has been shown and described herein with reference to a specific embodiment thereof, it will be apparent to those skilled in the art that many variations thereof may be employed without departing from the principles and features of the invention as defined in the appended claims.

What is claimed is:

1. Apparatus for loading bulk material comprising, in combination, a tower, means mounting the tower for movement back and forth along a quay between predetermined limits of travel, a hopper having a bottom outlet throat mounted at a substantial elevation on said tower, a hollow elongated delivery means connected at one end to the tower for receiving bulk material discharged from the hopper through its outlet throat, said delivery means normally extending generally outwardly and downwardly from the tower to a lower discharge opening and being swingably connected to the tower for adjustably positioning its lower discharge opening relative to a receptacle to be loaded, a gate operative to open and close the outlet throat of the hopper, a stationary conveyor having an extensible and contractible delivery reach running along the quay toward the tower from a remote source of bulk material to a movable transfer mechanism therebetween, a second conveyor running from said transfer mechanism to the hopper on the tower, said second conveyor being connected at one end to said transfer mechanism and at its opposite end to said tower to cause said transfer mechanism to move as a unit with said tower and second conveyor and to correspondingly extend and retract the delivery reach of the stationary conveyor, separate drives for said conveyors, first means operative to energize both of said drives at predetermined relative speeds, second means for energizing only the drive for the second conveyor while the drive for the stationary conveyor is idle, third means selectively operative to move said tower toward and away from the delivery reach of the stationary conveyor, and interlock means preventing movement of said tower toward the delivery reach of the stationary conveyor unless said second means is conditioned to energize the drive for the second conveyor and said first means is rendered inoperative to energize the drive for the stationary conveyor.

2. In apparatus for feeding bulk material to a hopper on a traveling tower from a stationary remote source, the combination with said tower and hopper of means mounting the tower for movement back and forth along a predetermined path between fixed limits of travel, a stationary conveyor having an extensible and contractible delivery reach running from said remote source toward the tower to a movable transfer mechanism therebetween, a second conveyor running from said transfer mechanism to the hopper on the tower, said second conveyor being connected at one end to said transfer mechanism at its opposite end to said tower to cause said transfer mechanism to move as a unit with said tower and second conveyor and to correspondingly extend and retract the delivery reach of the stationary conveyor, separate drives for said conveyors, first means operative to energize both of said drives to run at predetermined relative speeds, second means to energize only the drive for the second conveyor while the drive for the stationary conveyor is idle, third means selectively operative to move said tower toward and away from the delivery reach of the stationary conveyor, and interlock means preventing movement of said tower toward the delivery reach of the stationary conveyor unless said second means is conditioned to energize the drive for the second conveyor and said second means is rendered inoperative to energize the drive for the stationary conveyor.

3. The combination of claim 2, including speed determining means for maintaining the speed of the second conveyor at least equal to the speed of the tower as the tower moves toward the idle stationary conveyor.

4. The combination of claim 3, including a discharge opening in the bottom of said hopper and a gate operative to open and close said discharge opening.

5. Apparatus for loading bulk material, comprising, in combination, a traveling tower, a hopper having a bottom outlet throat, the hopper being mounted in a fixed location at a substantial elevation on the tower, a hollow elongated delivery means pivotally connected at an open receiving end thereof in registration with the outlet throat of the hopper and pivoted to the tower for receiving bulk material discharged from the hopper through its outlet throat, said delivery means normally extending generally outwardly and downwardly from said throat to a lower discharge opening of the delivery means, and being swingable about its pivotal connection to the tower to an outwardly and upwardly extending inoperative position for clearing obstructions extending higher than the hopper while the tower is moved from one loading location to another, and a gate operative to open and close the bottom outlet throat of the hopper to retain bulk material therein when the delivery means is raised to said inoperative position, said delivery means including a bottom plate, side plates, and a top plate defining an open receiving end portion thereof, the outlet throat of said hopper substantially registering with the receiving end of the delivery means with bottom and side plates of the hopper throat projecting inside the receiving end of the delivery means, the axis of pivotal movement of the delivery means on the tower being parallel to said top and bottom plates of the delivery means and closer to the bottom plate than the top plate thereof, and said top plate of the delivery means being mounted thereon for coplanar sliding movement relative thereto for avoiding interference between the delivery means and hopper throat as the delivery means is swung about its pivotal axis.

6. The structure defined in claim 5 in which said top plate of the delivery means is pivotally connected to said outlet throat for imparting its sliding movement thereto.

7. Apparatus for loading bulk material comprising, in combination, a tower, a hopper serving as a surge bin having a bottom outlet throat mounted at a substantial elevation on the tower, a hollow elongated delivery means connected at one end to the tower for receiving bulk material discharged from the hopper through its outlet throat, said delivery means normally extending generally outwardly and downwardly from the tower to a lower discharge opening and being swingable in relation to the hopper and carried on the tower for adjustably positioning its lower discharge opening relative to a receptacle to be loaded while receiving material from the hopper, means for adjusting the size of the lower discharge opening of the delivery means for controlling the rate of discharge of bulk material therethrough, a conveyor for transporting bulk material from a remote source into the hopper on the tower, a variable speed drive for said conveyor, material level sensing means associated with said hopper, said sensing means being connected to the drive for said conveyor for varying the speed thereof inversely with change in level of bulk material therein between a maximum speed when the level is below a predetermined low point on the hopper and zero speed when the level rises as high as a predetermined high point on the hopper, said sensing means comprising a radiation detector mounted externally of the hopper on one side thereof, a plurality of ultrashort-wave radiation sources mounted at different levels externally of the hopper on the opposite side thereof, said sources being located to emit their radiation in the direction of the detector for travel through the hopper walls to the detector, and means responsive to the intensity of radiation reaching the detector from said sources for varying the speed of the conveyor inversely with the intensity of radiation reaching the detector.

8. In apparatus for feeding bulk material from a conveyor into a delivery chute, the combination of a large surge bin type hopper having a bottom outlet throat, a delivery chute positioned for receiving bulk material discharged from the hopper through its outlet throat, manually controlled means for varying the rate of discharge from said delivery means, a conveyor for transporting bulk material from a remote source into the hopper, means for feeding bulk material at a substantially constant rate to the conveyor at said source, a variable speed drive for said conveyor, material level sensing means associated with said hopper, said sensing means being connected to the drive for said conveyor for varying the speed thereof inversely with change in level of bulk material therein between a maximum speed when the level is below a predetermined low point on the hopper and zero speed when the level rises to a predetermined high point on the hopper, said sensing means comprising a radiation detector mounted externally of the hopper on one side thereof, a plurality of ultrashort-wave radiation sources mounted at different levels externally of the hopper on the opposite side thereof, said sources being located to emit their radiation in the direction of the detector for travel through the hopper walls to the detector, and means responsive to the intensity of radiation reaching the detector from said sources for varying the speed of the conveyor inversely with the intensity of radiation reaching the detector.

References Cited in the file of this patent

UNITED STATES PATENTS

| | | |
|---|---|---|
| 1,331,020 | MacLennan | Feb. 17, 1920 |
| 1,852,385 | Weigert | Apr. 5, 1932 |
| 1,961,893 | Wadman | June 5, 1934 |
| 2,687,817 | Browne | Aug. 31, 1954 |
| 2,713,124 | Graham | July 12, 1955 |
| 2,737,997 | Himmelheber et al. | Mar. 13, 1956 |
| 2,828,422 | Steierman | Mar. 25, 1958 |